No. 896,450. PATENTED AUG. 18, 1908.
W. E. JOHNSON.
CULTIVATOR.
APPLICATION FILED JAN. 19, 1906.
3 SHEETS—SHEET 1.
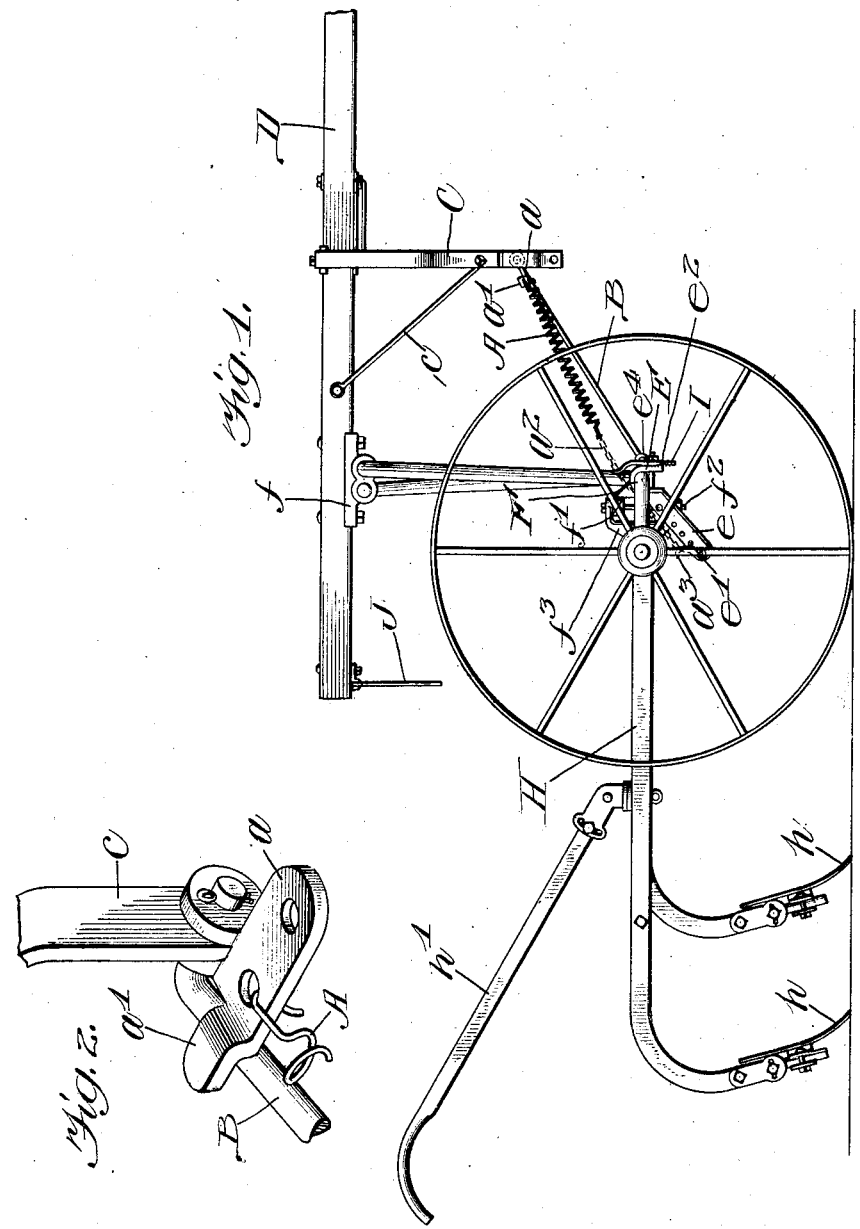
Witnesses:
Robert A. Weir
J B Weir
Inventor:
William E. Johnson
By Bulkley & Durand
Attys.

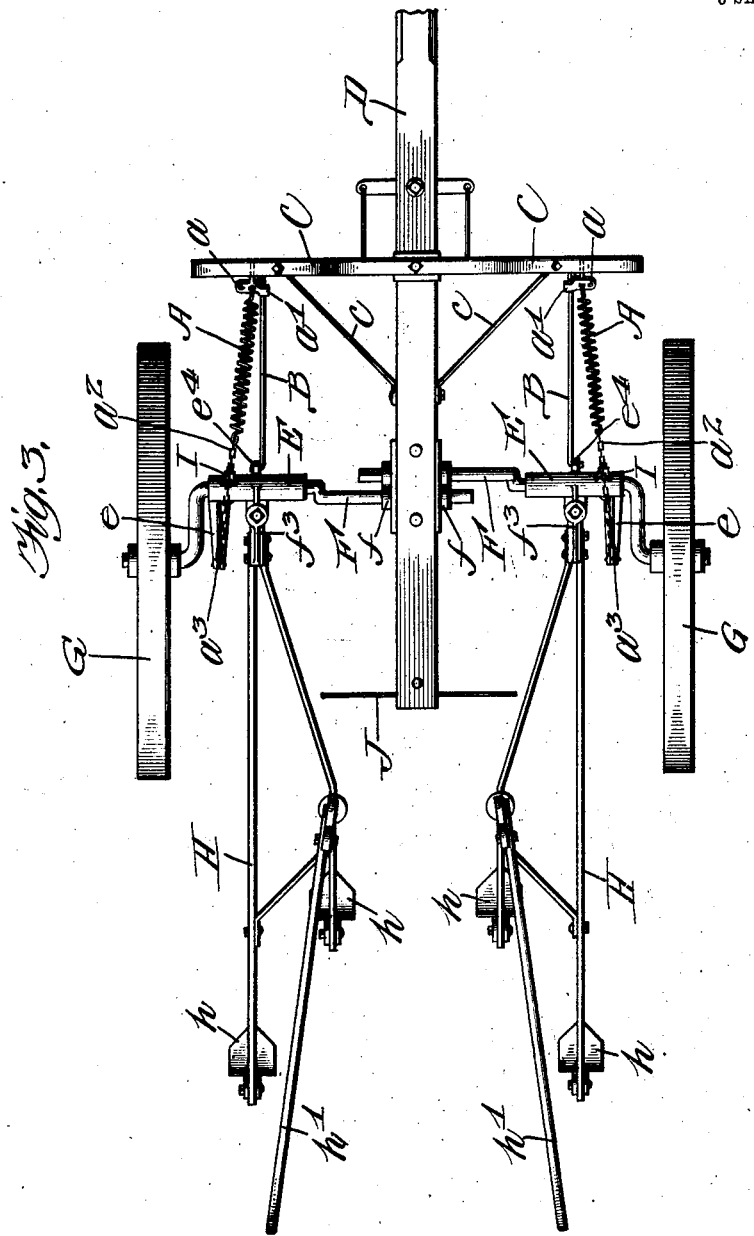

No. 896,450.　　　　　　　　　　　PATENTED AUG. 18, 1908.
W. E. JOHNSON.
CULTIVATOR.
APPLICATION FILED JAN. 19, 1906.
3 SHEETS—SHEET 3.
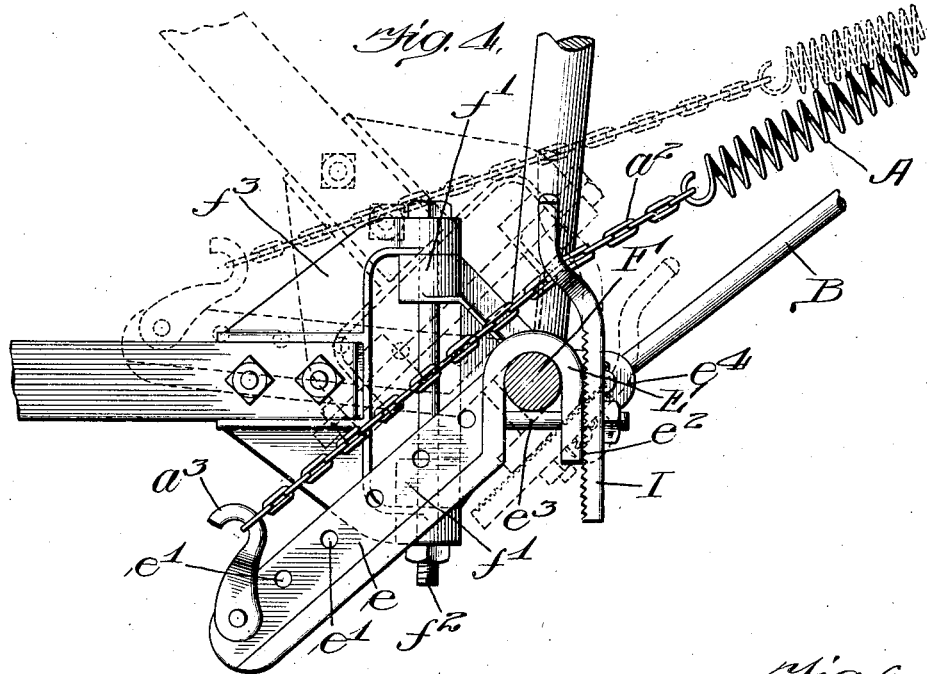
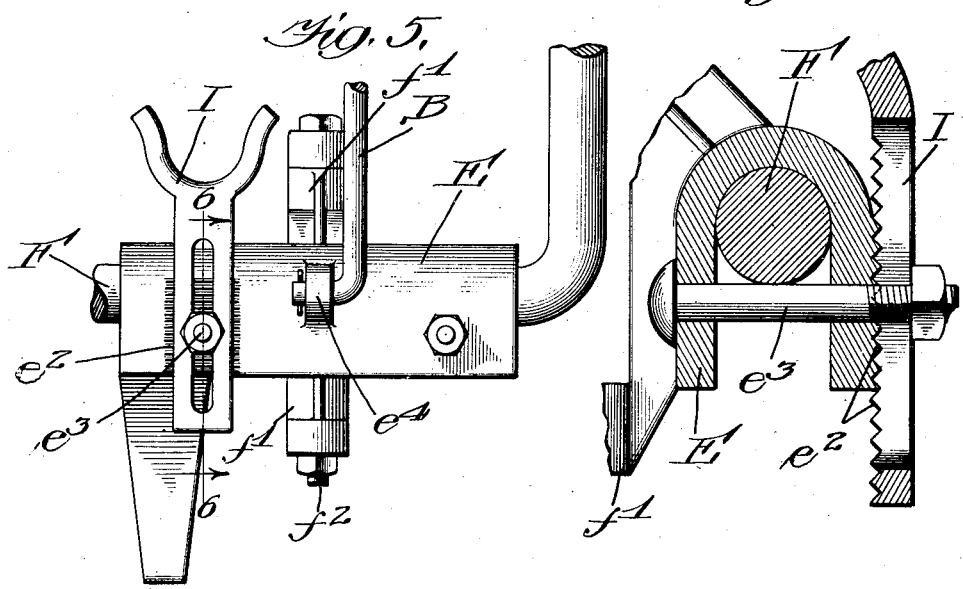
Witnesses:　　　　　　　　　　　Inventor:
　　　　　　　　　　　　　　　　William E. Johnson

UNITED STATES PATENT OFFICE.

WILLIAM E. JOHNSON, OF ROCK ISLAND, ILLINOIS, ASSIGNOR TO ROCK ISLAND PLOW COMPANY, OF ROCK ISLAND, ILLINOIS, A CORPORATION OF ILLINOIS.

CULTIVATOR.

No. 896,450.    Specification of Letters Patent.    Patented Aug. 18, 1908.

Application filed January 19, 1906. Serial No. 296,752.

*To all whom it may concern:*

Be it known that I, WILLIAM E. JOHNSON, a citizen of the United States of America, and resident of Rock Island, Rock Island county, Illinois, have invented a certain new and useful Improvement in Cultivators, of which the following is a specification.

My invention relates to cultivators in general, but more particularly to cultivators of that class in which the shovels are arranged in two groups or gangs, and especially to cultivators in which provision is made for using the same as a walking cultivator, and in which means are provided for regulating or varying the depth to which the shovels may enter the ground.

Generally stated, the object of my invention is the provision of an improved and highly efficient cultivator of the foregoing general character.

Special objects of my invention are the provision of an improved arrangement for regulating or varying the depth to which the shovels may enter the ground; the provision of an improved construction and arrangement whereby the lifting springs may be suitably connected with the shovel gangs and led forward to suitable points on the frame, so that the lifting leverage will increase as the tension or lifting power of the springs decreases—that is to say, when the shovel gangs are raised out of the ground; the provision of an improved construction and arrangement for obtaining an efficient regulation of the depth to which the shovels may enter the ground, and at the same time avoiding the necessity of connecting the lifting springs directly to the beams of the shovel gangs; and the provision of certain details and features of improvement tending to increase the general efficiency and serviceability of a cultivator of this particular charactor.

To the foregoing and other useful ends, my inventiom consists in matters hereinafter set forth and claimed.

In the accompanying drawings, Figure 1 is a side elevation of a cultivator embodying the principles of my invention. Fig. 2 is an enlarged detail perspective view of the forward connection of one of the lifting springs. Fig. 3 is a plan of the cultivator shown in Fig. 1. Fig. 4 is an enlarged side elevation of one of the connections between the shovel gangs and the wheel axle, showing the method of connecting the rear ends of the lifting springs with the same. Fig. 5 is a front elevation of the devices shown in Fig. 4. Fig. 6 is an enlarged cross-section on line 6—6 in Fig. 5.

As thus illustrated, and referring more particularly to Figs. 2, 4, 5 and 6, my invention comprises the lifting springs A which have their forward ends connected with the attaching devices $a$, these springs thus having a rearward and downward direction or trend. These attaching devices $a$ are of the character shown in Fig. 2, and are mounted upon the out-turned end portions of the draft rods B, which latter are connected with the draft or frame member C secured to the tongue D. As shown, each attaching device $a$ has a lug $a^1$ adapted to bear upon its allotted or adjacent draft rod B. These rods are extended rearward and downward and connected at their rear ends with the castings E, which latter are, it will be seen, loosely mounted upon the axles F. These axles have their upper ends suitably mounted in a casting $f$ secured to the tongue, and have their lower ends bent rearward and provided with supporting or vehicle wheels G. See Figs. 1 and 3.

Each casting E is constructed as shown more clearly in Figs. 4, 5 and 6, each casting being provided with rearwardly extending portions $f^1$, and through these portions the bolts $f^2$ are inserted vertically. Upon these bolts are mounted the beam castings $f^3$, which latter are secured to the forward ends of the shovel gangs H. These gangs can be provided with shovels $h$ of any suitable or desired character. Also each shovel gang is provided with a detachable handle $h^1$, whereby the cultivator is adapted for use as a walking cultivator.

The two gangs can swing laterally about the bolts $f^2$ in the usual and well known manner. It will also be seen that each casting E is provided with a rearwardly and downwardly extending arm $e$, provided with a series of holes $e^1$. Upon the forward surface or face of each casting E a vertical row of horizontal teeth $e^2$ is provided, and these teeth are adapted to be engaged by similar teeth on the inner surfaces of the vertically adjustable chain-supporting members I. The bolts $e^3$, which hold the castings E upon the axles, serve also to clamp the vertically adjustable members I upon the toothed or roughened surfaces of the said castings. In this way the members I can be adjusted and held at any desired height relatively to the castings E upon which they are mounted. The ears $e^4$, formed upon the said forward surfaces or faces of the castings E, constitute the means by which the rear ends of the draft rods B are suitably secured to said castings, so that the draft or back pull of the gangs may be sustained by the frame or draft members C, which latter are secured to the tongue or pole D and braced thereon by rods c.

Each lifting spring A has its rear end hitched to a chain $a^2$, and the rear end of the latter is in turn hitched to a hook $a^3$. These hooks $a^3$ are adjustable along the length of the rigid arms e, by simply transferring them from one hole $e^1$ to another. With this arrangement, the chains $a^2$ are supported by the members I when the shovel gangs are in the ground, as shown more clearly in Figs. 1 and 4. When the gangs are up the springs hold them in such position; but when the gangs are down the tension of the springs is such that the gangs are yieldingly retained in the ground. The depth to which the shovels enter the ground is regulated by adjusting the members I vertically upon their respective castings, so as to in effect produce a longitudinal tension on the spring connections, which lateral pressure on the spring connections may be varied to vary the working depth of the shovels.

In the drawings the hooks $a^3$ are shown at the limit of their rearward adjustment, thereby giving the springs an extreme tension. If less tension is desired the hooks can be moved nearer to the axles—that is to say, nearer to the members I.

When the gangs are raised, it will be seen that the springs start with a comparatively slight leverage on the gangs. Obviously, however, and as a feature of special improvement, this leverage increases as the gangs move upward, inasmuch as such movement swings the arms e more nearly at right angles to the direct or forward pull of the springs.

In regulating the tension of the springs, the chains $a^2$ can be lengthened or shortened, so as to permit the shifting of the hooks $a^3$ from one hole to another, and so as to practically lengthen or shorten the spring-lifting connections between the gangs and the forward points of attachment. When the gangs are raised they can be supported in suitable hooks J secured to the rear end of the tongue, so as to preclude their falling back against the tension of the lifting springs. When the shovels are in the ground, their tendency to swing downward can only result in moving the members I upward, and it is the resistance offered by the chains $a^2$ to this upward movement of the member I that prevents the shovels from descending any farther. In other words, the shovel gangs are permitted to lower to a point where the lengthwise tension or pull of the springs is practically nothing, inasmuch as the line of pull is close to or practically coincident with the axis about which the gangs swing. However, as is evident, any movement of the shovels below this point is promptly counteracted by an increasing tension or leverage, so to speak, upon the members I. Thus the arrangement permits the shovels to descend against the pull or tension of the springs to the desired depth or level, and the working depth of the shovels is then regulated by the vertical adjustment of the members I. For example, the shovels can be allowed to work at a considerable depth by lowering the members I; while on the other hand they can be caused to work at a very shallow depth by adjusting the members I to the full extent of their upward movement. Thus, with the foregoing arrangement, a very efficient spring-lifting arrangement is provided for cultivators in which provision is made for using the same as a walking cultivator; the depth is easily regulated, and, furthermore, the gangs are not directly connected with the springs, but to the contrary are connected therewith through the medium of the rocking or oscillating castings on the axles. Thus the gangs are left free to swing from side to side in a free and unrestricted manner, while at the same time the power or leverage of the springs in lifting the gangs increases constantly as the gangs move upward, and as the tension of the springs decreases. In other words, the springs exert the least leverage on the gangs at a time when their tension or power is greatest; and then exert a maximum leverage on the gangs at the time when their tension or power is somewhat less, and consequently at a time when an increased leverage is needed. In this way the gangs are very satisfactorily and efficiently controlled in all ways.

It will be understood, of course, that the adjustment of the hooks $a^3$ along the lengths of the lever arms e is also useful in varying the degree of lifting leverage which the springs exert upon the gangs while the same are being raised. For heavy springs a very slight leverage would perhaps be sufficient, while for lighter springs a greater or longer leverage might be necessary. These are conditions which depend upon the requirements of the work, and the desires of the operator. Whatever degree of adjustment is required, however, the same is well provided for by the arrangement described and illustrated.

What I claim as my invention is—

1. A cultivator comprising wheel axles, rocking castings on said axles, shovel gangs swingingly connected to said castings, lifting springs having their rear ends connected with said castings and having their forward ends hitched to the cultivator structure, whereby the gangs are adapted to swing freely from side to side, and vertically adjustable means on said castings for engaging the under-side of said spring connections to vary the working depth of the shovels.

2. A cultivator comprising a wheel axle construction, rocking castings on said axle construction, shovel gangs swingingly connected with said castings, lifting springs having their rear ends hitched to said castings, and vertically adjustable means on said castings for engaging the under side of said spring connections to vary the working depth of the shovels.

3. A cultivator comprising axle means, rocking members on said axle means, shovel gangs rockingly connected with said shovel members, each rocking member having a rearwardly and downwardly extending arm, lifting springs having their rear ends hitched to said arms and having their forward ends provided with suitable means of support, walking handles on said gangs, and adjustable members on said rocking members, said adjustable members being adapted to be raised and lowered to lift or lower the spring connections at points between their forward and rear ends, and to thus vary the working depth of the shovels.

4. A cultivator comprising shovel gangs, wheel axles, connections between the wheel axles and the shovel gangs, lever arms carried by said connections, lifting springs extending downwardly and rearwardly and connected with said lever arms, said lever arms extending substantially in the line of the tension of the springs when the gangs are in the ground so that the said springs exert a constantly increasing lifting leverage on the gangs, and have a maximum leverage thereon when the gangs are fully raised, and vertically adjustable means on said castings for engaging the underside of said spring connections to vary the working depth of the shovels.

5. A cultivator comprising wheel axles, rocking members on said axles, each rocking member having a rearwardly and downwardly extending lever arm, shovel gangs swingingly connected with said rocking members, downwardly and rearwardly extending lifting springs, means for connecting the rear ends of said springs at different points in the lengths of said lever arms, to vary the tension of said springs, or to vary the lifting leverage of the springs on the gangs, and adjustable means carried by said rocking members and adapted for engaging the spring connections at points between their forward and rear ends to gage the working depth of the shovels.

6. A cultivator comprising shovel gangs, wheel axles, rocking members E mounted on said axles and provided with lever arms $e$, vertically adjustable members I, carried by said rocking members, hooks $a^3$ carried by said lever arms, swinging connections between said rocking members and said shovel gangs, rearwardly extending lifting spring connections attached to said hooks and adapted to rest upon said members I to gage the working depths of the shovels, a tongue or pole, and suitable draft or frame structure to which the forward ends of said springs are hitched.

7. A cultivator comprising shovel gangs, wheel axles, rocking members E mounted on said axles and provided with lever arms $e$, vertically adjustable members I, carried by said rocking members, hooks $a^3$ carried by said lever arms, swinging connections between said rocking members and said shovel gangs, rearwardly extending lifting spring connections attached to said hooks and adapted to rest upon said members I to gage the working depths of the shovels, a tongue or pole, and suitable draft or frame structure to which the forward ends of said springs are hitched, together with detachable walking handles for said gangs.

8. A cultivator comprising shovel gangs, members to which said gangs are connected to swing toward and away from each other, and lifting springs connected with said member, whereby the lateral swing of said gangs is independent of the springs by which they are lifted, and vertically adjustable means adapted to engage said shovels whereby the working depth thereof may be varied.

Signed by me at Rock Island Ill. this 9th day of Jany. 1906.

WILLIAM E. JOHNSON.

Witnesses:
A. B. Frenier,
E. C. Dean.